United States Patent
Nam et al.

(10) Patent No.: US 9,523,305 B2
(45) Date of Patent: Dec. 20, 2016

(54) SYSTEM FOR CONTROLLING AIR FLOW RATE INTO VEHICLE ENGINE COMPARTMENT

(71) Applicant: Hyundai Motor Company, Seoul (KR)

(72) Inventors: Jongwoo Nam, Seoul (KR); Hanshin Chung, Yongin-si (KR); Joonho Lee, Seoul (KR); Hyun Cho, Seoul (KR)

(73) Assignee: Hyudai Motor Company, Seoul (KR)

( * ) Notice: Subject to any disclaimer, the term of this patent is extended or adjusted under 35 U.S.C. 154(b) by 214 days.

(21) Appl. No.: 14/550,198

(22) Filed: Nov. 21, 2014

(65) Prior Publication Data

US 2015/0315955 A1     Nov. 5, 2015

(30) Foreign Application Priority Data

May 2, 2014 (KR) .................. 10-2014-0053635

(51) Int. Cl.

| | |
|---|---|
| *F01P 9/04* | (2006.01) |
| *F28D 7/10* | (2006.01) |
| *F01P 3/18* | (2006.01) |
| *F01P 5/02* | (2006.01) |
| *F01P 7/10* | (2006.01) |
| *B60K 11/08* | (2006.01) |

(52) U.S. Cl.
CPC ............... *F01P 3/18* (2013.01); *B60K 11/085* (2013.01); *F01P 5/02* (2013.01); *F01P 7/10* (2013.01)

(58) Field of Classification Search
CPC ............. F01P 7/16; F01P 2060/16; F01P 3/18; F01P 2037/00; F01P 2070/10; F01P 5/02; F01P 7/10; F01P 11/02; F01P 2011/205; B60K 11/04; B60K 11/02; B60K 11/085; F02B 29/0462; F24H 3/06; F24H 9/0052; F24H 9/2064
USPC ............. 123/41.04, 41.01, 41.3; 165/140, 10
See application file for complete search history.

(56) References Cited

U.S. PATENT DOCUMENTS

| | | | | |
|---|---|---|---|---|
| 1,949,009 | A * | 2/1934 | Dintilhac | ......... G05D 23/27537 123/41.04 |
| 3,854,459 | A * | 12/1974 | Stimeling | ................ F01P 11/10 123/41.04 |
| 6,994,058 | B2 | 2/2006 | Iinuma et al. | |

(Continued)

FOREIGN PATENT DOCUMENTS

| | | | | |
|---|---|---|---|---|
| DE | 102005035017 | A1 * | 2/2007 | .......... F02B 29/0443 |
| GB | 2143025 | A * | 1/1985 | ............. F24D 11/002 |

(Continued)

*Primary Examiner* — John Kwon
*Assistant Examiner* — Tea Holbrook
(74) *Attorney, Agent, or Firm* — Morgan, Lewis & Bockius LLP (57) ABSTRACT

A system for controlling a flow rate of air into a vehicle engine compartment may include a radiator cooling coolant, a coolant inflow tank provided to one side of the radiator and temporarily storing coolant that cools an engine, a coolant exhaust tank provided to the other side of the radiator and temporarily storing coolant circulating past a cooling fin of the radiator from the coolant inflow tank, Phase Change Material (PCM) tanks provided to an exterior side of the coolant inflow tank and coolant exhaust tank and storing a phase change material heat-exchanging with the coolant stored in the coolant inflow tank and the coolant exhaust tank and a conversion device converting a phase of the phase change material.

16 Claims, 10 Drawing Sheets

(56) References Cited

U.S. PATENT DOCUMENTS

| | | | |
|---|---|---|---|
| 7,882,888 B1* | 2/2011 | Bugby | F28D 1/0477 165/10 |
| 8,210,246 B2* | 7/2012 | Bhatti | F28D 1/0426 165/140 |
| 2008/0216777 A1* | 9/2008 | Vetrovec | F01P 11/20 123/41.29 |
| 2010/0263375 A1* | 10/2010 | Grieve | F02B 29/0412 60/612 |
| 2012/0227926 A1* | 9/2012 | Field et al. | F24D 11/003 165/10 |
| 2012/0263980 A1* | 10/2012 | Soukhojak | C09K 5/04 429/50 |
| 2012/0291991 A1* | 11/2012 | Denkenberger | B21D 53/045 165/81 |
| 2014/0090808 A1* | 4/2014 | Bessho | C09K 5/063 165/104.17 |

FOREIGN PATENT DOCUMENTS

| | | |
|---|---|---|
| JP | 7-208162 A | 8/1995 |
| JP | 11-182393 A | 7/1999 |
| JP | 4450066 B | 2/2010 |
| JP | 2012-240478 A | 12/2012 |
| KR | 10-2011-0080037 A | 7/2011 |
| KR | 10-2012-0058070 A | 6/2012 |
| KR | 10-1180195 B1 | 9/2012 |

* cited by examiner

SYSTEM FOR CONTROLLING AIR FLOW RATE INTO VEHICLE ENGINE COMPARTMENT

CROSS-REFERENCE TO RELATED APPLICATION

The present application claims priority to Korean Patent Application No. 10-2014-0053635 filed May 2, 2014, the entire contents of which is incorporated herein for all purposes by this reference.

BACKGROUND OF THE INVENTION

Field of the Invention

The present invention relates to a system for controlling a rate of air flow into a vehicle engine compartment and a control method thereof, and more particularly, to a system for controlling a rate of air flow rate into a vehicle engine compartment and a control method thereof which may improve cooling performance and aerodynamic performance of a vehicle.

Description of Related Art

In general, a radiator for cooling an engine and a condenser for condensing a refrigerant in an air conditioner are mounted in a vehicle, and temperatures of the radiator and the condenser are lowered by operating a cooling fan. It is advantageous to quickly raise the temperature of the engine to an appropriate level when the vehicle is initially started in order to improve fuel efficiency, and the temperature of the engine needs to be maintained at an appropriate temperature after the vehicle is started.

The cooling fan is traditionally operated by operation of the engine, but this mechanical method has a drawback in that fuel efficiency of the vehicle deteriorates because the cooling fan is always operated whenever the engine is operated.

Recently, a method of operating an electric motor has been used, and with respect to the above method, the cooling fan is operated only out of necessity in response to a driving state of the vehicle such that there is an effect of improving fuel efficiency, and as a result, the use of this manner is increased.

Meanwhile, aerodynamic characteristics greatly affect fuel efficiency and speed of the vehicle when a traveling speed of the vehicle is increased, and when air flowing into an engine compartment of the vehicle is shut off when the vehicle travels at a high speed, drag, which is generated when air passes through the engine compartment, is reduced so that fuel efficiency may be improved.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a system for controlling a flow rate of air into a vehicle engine compartment and a control method thereof, which may improve cooling performance and aerodynamic performance of a vehicle.

In addition, various aspects of the present invention are directed to providing a system for controlling a flow rate of air into a vehicle engine compartment and a control method thereof, which may reduce drag by minimizing an operation of a cooling fan, and shutting off air flowing into an engine compartment out of necessity.

According to various aspects of the present invention, a system for controlling a flow rate of air into a vehicle engine compartment may include a radiator cooling coolant, a coolant inflow tank provided to one side of the radiator and temporarily storing coolant that cools an engine, a coolant exhaust tank provided to the other side of the radiator and temporarily storing coolant circulating past a cooling fin of the radiator from the coolant inflow tank, Phase Change Material (PCM) tanks provided to an exterior side of the coolant inflow tank and coolant exhaust tank and storing a phase change material heat-exchanging with the coolant stored in the coolant inflow tank and the coolant exhaust tank, and a conversion device converting a phase of the phase change material.

The phase change material may be sodium acetate.

The conversion device may include a metal plate provided in the phase change material, and an electromagnet changing a shape of the metal plate.

The system may further include a fan in which a cooling fan including a fan motor and a fan blade is mounted, the fan shroud being disposed between the radiator and the engine, a rotary shutter which is provided in the fan shroud while corresponding to an operation area of the fan blade, and in which an area through which air passes is varied in a circumferential direction, and a plurality of flaps which are provided in the fan shroud, and that open and close a part of a portion where the rotary shutter is not mounted.

The rotary shutter may include a plurality of shutter blades which are provided to be rotatable about a same rotation shaft, and a shutter actuator which rotates the plurality of shutter blades, and changes an area through which air passes.

The shutter blades may include an operation blade which is rotated about the rotation shaft by an operation of the shutter actuator, and a plurality of sub-blades which are provided to be superimposed on a basis of the rotation shaft so as to be spread or folded fanwise in accordance with rotation of the operation blade.

Operation protrusions may be provided to the shutter blades, respectively, and when the operation blade is spread or folded, any one of the plurality of sub-blades may be spread or folded, and the remaining sub-blades may be sequentially spread or folded.

Electromagnets may be provided on the plurality of flaps so that the plurality of flaps are opened and closed in accordance with an electric current supplied to the electromagnets.

The system may further include an air flow rate control shutter apparatus disposed between the radiator and a condenser disposed at the front of the radiator, in which the air flow rate control shutter apparatus may include vertical supporting portions provided as a pair, a plurality of air flaps provided to the vertical supporting portion so as to be spread or folded, a delivery unit selectively spreading the air flaps, a rotation unit selectively rotating the air flaps, and a controller controlling the delivery unit and the rotation unit according to an operation status of a vehicle.

The vertical supporting portion may include a guide rail having a width which becomes smaller along a lower direction, in which stoppers may be provided in the plurality of air flaps, and the stoppers have a size corresponding to the width of the guide rail so that the plurality of air flaps are positioned at a predetermined position.

The delivery unit may include a delivery screw provided to any one of the guide rails, a delivery plate supporting the lowest air flap of the plurality of air flaps, engaged with the delivery screw, and adjusting a position of the lowest air flap when the delivery screw is rotated, and a delivery motor selectively rotating the delivery screw.

The rotation unit may include rotation gears respectively engaged to the plurality of air flaps, a rotation screw provided to another guide rail and selectively engaged with the rotation gears, and a rotation motor selectively rotating the rotation screw.

The delivery unit may include a delivery screw provided to any one of the guide rails, and a delivery plate supporting the lowest air flap of the plurality of air flaps, engaged with the delivery screw, and adjusting a position of the lowest air flap when the delivery screw is rotated, the rotation unit may include rotation gears respectively engaged to the plurality of air flaps and a rotation screw provided to the other guide rail and selectively engaged with the rotation gears, and the air flow rate control shutter apparatus may further include a driving motor selectively rotating the delivery screw or the rotation screw.

The system may further include an encapsulator which surrounds the engine compartment.

The system may further include a controller controlling an open area of the rotary shutter, operations of opening and closing the plurality of fan flaps, the cooling fan, the delivery unit, and the rotation unit according to an operation status of the vehicle, in which the operation modes of the system may include a first mode in which the plurality of flaps are closed, the rotary shutter is completely closed, the plurality of air flaps are completely closed, and the operation of the cooling fan is turned off, a second mode in which the plurality of fan flaps are closed, the rotary shutter is completely opened, a rotation angle of the air flaps is controlled in a state that the plurality of air flaps are expanded, and the operation of the cooling fan is turned off, a third mode in which the plurality of fan flaps are opened, the rotary shutter is completely opened, the air flaps are completely opened in a state that the plurality of air flaps are expanded, and the operation of the cooling fan is turned off, and a fourth mode in which the plurality of fan flaps are closed, the open area of the rotary shutter is controlled, the plurality of air flaps are folded, and the operation of the cooling fan is controlled.

The system may further include an atmospheric temperature sensor which measures atmospheric temperature, and outputs a corresponding signal, a speed sensor which measures a vehicle speed, and outputs a corresponding signal, an air conditioning pressure sensor which measures air conditioning internal pressure, and outputs a corresponding signal, an air conditioning switch sensor which measures an operational signal of an air conditioning switch, and outputs a corresponding signal, a refrigerant temperature sensor which measures a refrigerant temperature, and outputs a corresponding signal, and a position sensor which measures the open area of the rotary shutter, and outputs a corresponding signal, in which the control unit determines the operating state of the vehicle based on the corresponding signals from the respective sensors, and controls operations of the rotary shutter, the plurality of flaps, and the cooling fan in accordance with the operating state of the vehicle in any one mode of the first to fourth modes.

According to various aspects of the present invention, since the coolant inflow tank and the coolant exhaust tank are provided to both sides of the radiator, an additional refrigerant storing tank does not need to be provided. Therefore, a degree of freedom for designing the vehicle engine compartment is increased.

Further, since the PCM tank is provided to the exterior of the coolant inflow tank and the coolant exhaust tank, cooling efficiency of the radiator is improved through heat-exchange between the coolant and the PCM.

Further, cooling performance may be improved by controlling use of the cooling fan based on the driving state of the vehicle, and aerodynamic performance may be improved by adjusting an amount of air flowing into the vehicle engine compartment.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
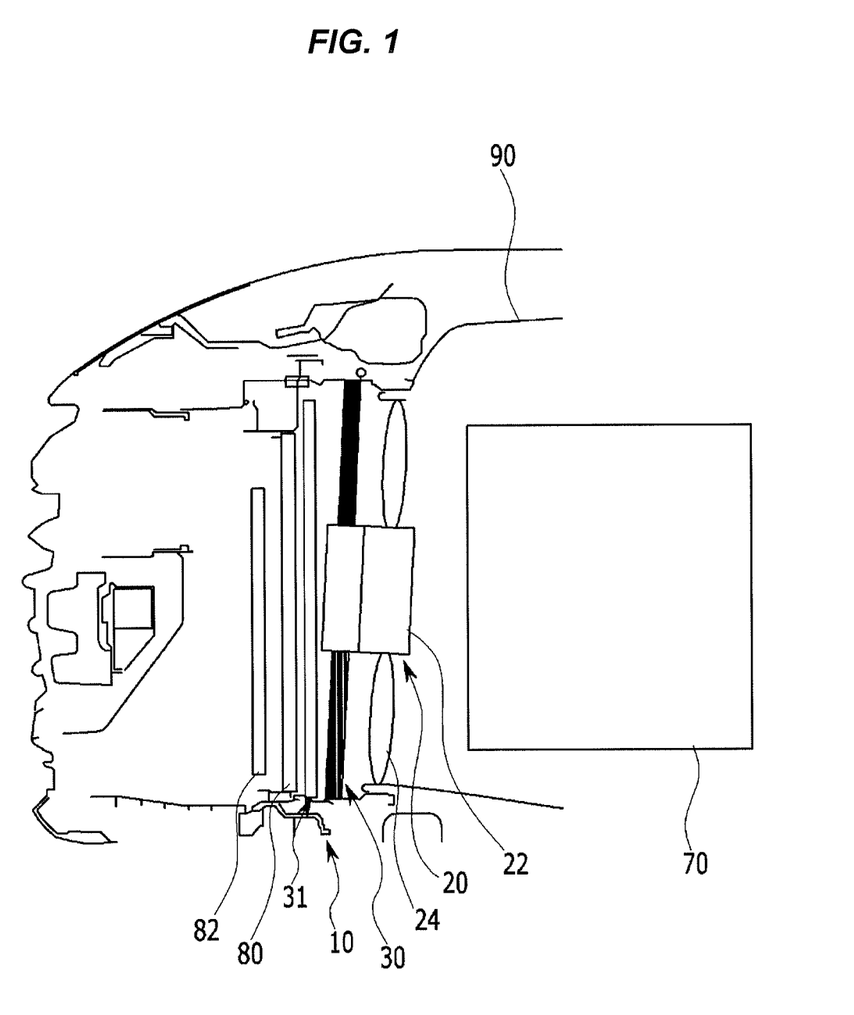
FIG. 1 is a cross-sectional view illustrating an exemplary system for controlling a rate of air flow into a vehicle engine compartment according to the present invention.
Figure 2:
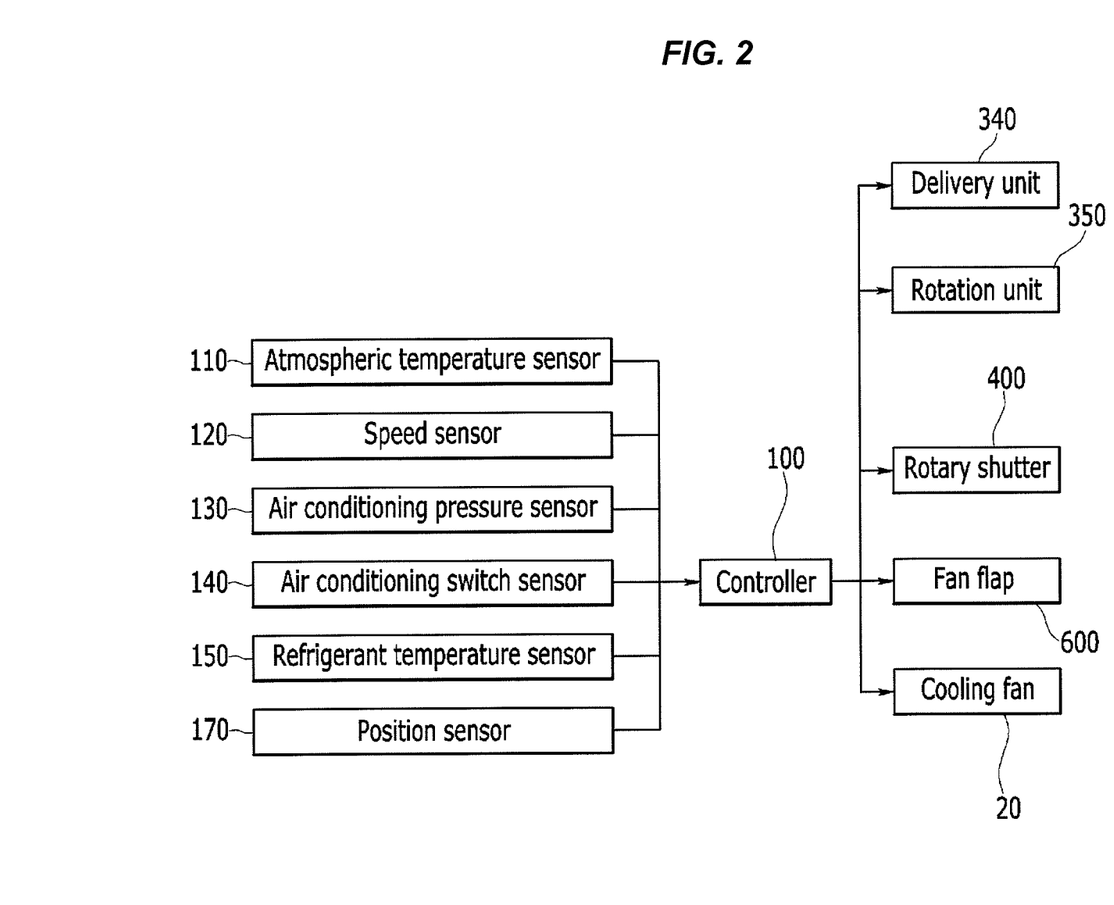
FIG. 2 is a block diagram illustrating the exemplary system for controlling the rate of air flow into the vehicle engine compartment according to the present invention.
Figure 3A:
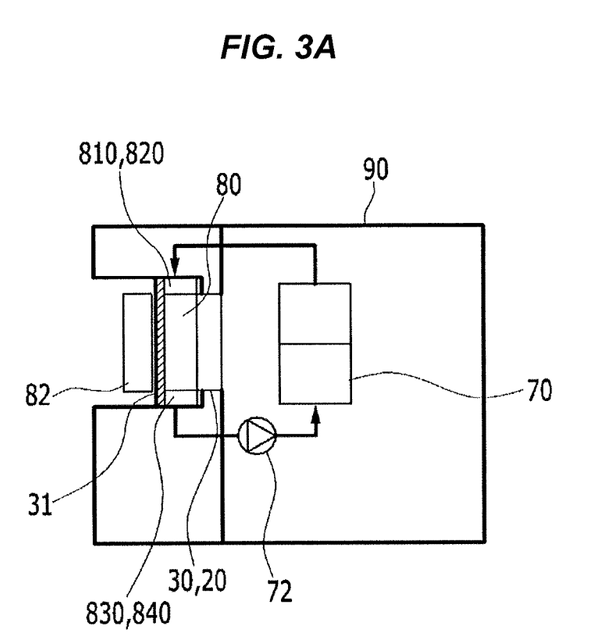
FIG. 3A and FIG. 3B are schematic diagrams illustrating the exemplary system for controlling the rate of air flow into the vehicle engine compartment according to the present invention.
Figure 3B:
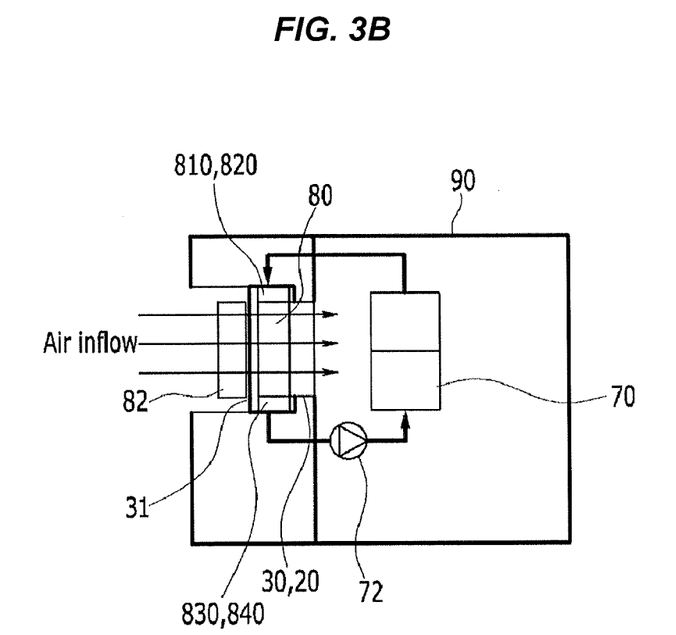

FIG. 1 is a cross-sectional view illustrating a system for controlling a flow rate of air into a vehicle engine compartment according to various embodiments of the present invention. FIG. 2 is a block diagram illustrating the system for controlling the flow rate of air into the vehicle engine compartment according to various embodiments of the present invention. FIG. 3A and FIG. 3B are schematic diagrams illustrating the system for controlling a flow rate of air into the vehicle engine compartment according to various embodiments of the present invention. FIG. 3A illustrates a state in which air flows into an engine compartment, and FIG. 3B illustrates a state in which air is blocked from the engine compartment.

As shown in FIG. 1, FIG. 2, FIG. 3A and FIG. 3B, a system for controlling a rate of air flow into a vehicle engine compartment includes a radiator 80 cooling a coolant, a coolant inflow tank 810 and a coolant exhaust tank 830 provided at respective sides of the radiator 80, an air flow rate control shutter apparatus provided at front of the radiator 80 and controlling an amount of air flowing into an engine 70, a fan shroud 30, a cooling fan 20 provided at the rear of the fan shroud 30, and a controller 100 controlling the fan shroud 30, the cooling fan 20, and the air flow rate control shutter apparatus.

A condenser 82 may be provided at the front of the radiator 80.

The system for controlling the rate of air flow into the vehicle engine compartment according to various embodiments of the present invention may further include an encapsulator 90 that surrounds the engine compartment, and the encapsulator 90 serves to prevent noise and vibration generated by the engine 70 from being transmitted to the outside of the vehicle body 10, and reduces drag by guiding wind which is generated when the vehicle travels when the wind flows into the engine compartment.

In addition, the encapsulator 90 preserves heat generated in the engine 70, and may enable the engine 70 to be operated at an optimum operation temperature when the vehicle travels again in a predetermined time after the vehicle stops.

The encapsulator 90 is formed to enclose the upper portion, the side portion, and the lower portion of the engine 70 in the engine compartment. That is, the encapsulator 90 is not formed to enclose the entire engine 70, and is formed to be opened at a part of the engine.

Referring to FIG. 2, the system for controlling a rate of air flow into a vehicle engine compartment may include an atmospheric temperature sensor 110 which measures an atmospheric temperature and outputs a corresponding signal, a speed sensor 120 which measures a vehicle speed and outputs a corresponding signal, an air conditioning pressure sensor 130 which measures air conditioning internal pressure and outputs a corresponding signal, an air conditioning switch sensor 140 which measures an operational signal of an air conditioning switch and outputs a corresponding signal, a refrigerant temperature sensor 150 which measures a refrigerant temperature and outputs a corresponding signal, and a position sensor 170 which measures an open area of the rotary shutter 400 and outputs a corresponding signal. The controller 100 receives output signals of respective sensors, determines the operating state of the vehicle based on the corresponding signals from the respective sensors, and controls the cooling fan 20, the fan shroud 30, and an air flow rate control shutter apparatus 31.

Figure 4A:
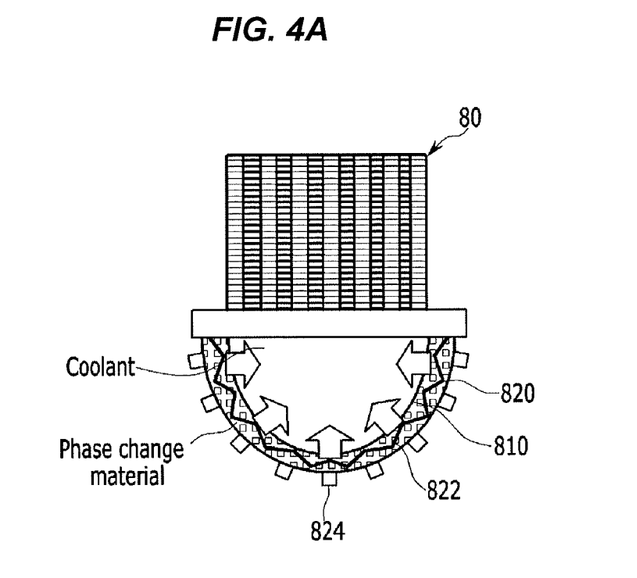
FIG. 4A and FIG. 4B are cross-sectional views illustrating a radiator, a refrigerant storing tank, and a PCM tank according to the present invention.
Figure 4B:
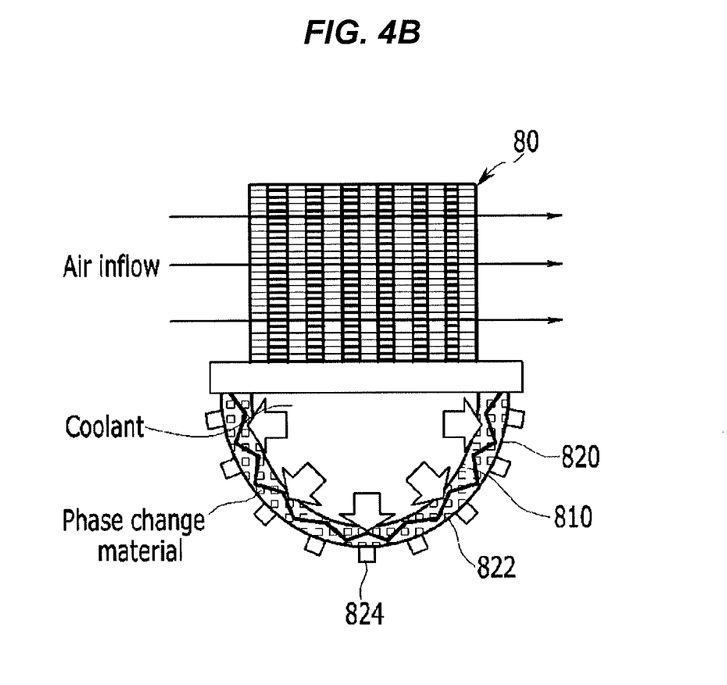

FIG. 4A and FIG. 4B are cross-sectional views illustrating a radiator, a refrigerant storing tank, and a PCM (phase change material) tank 820 according to various embodiments of the present invention.

As shown in FIG. 4A and FIG. 4B, the radiator 80 includes cooling fins, a coolant inflow tank 810, and a coolant exhaust tank 830. The radiator 80 cools coolant that cools the engine 70 with air, and thereby has a high temperature. The coolant inflow tank 810 is provided to one side of the radiator 80, and temporarily stores coolant that cools the engine 70. The coolant exhaust tank 830 is provided to the other side of the radiator 80, and temporarily stores coolant that circulates past the cooling fins from the coolant inflow tank 810.

The PCM tank 820 may be provided to an exterior side of the coolant inflow tank 810 and the coolant exhaust tank 830, and stores a phase change material. The phase change material (PCM) stored in the PCM tank 820 heat-exchanges with the coolant temporarily stored in the coolant inflow tank 810 and the coolant exhaust tank 830.

The phase change material may be a supersaturated solution such as sodium acetate tri-hydrate (SAT).

A conversion device for converting the phase of the phase change material is provided in the phase change material. The conversion device includes a metal plate 822 provided in the phase change material and an electromagnet 824 that changes a shape of the metal plate 822. The electromagnet 824 may be disposed at the exterior of the PCM tank 820.

The metal plate 822 is a thin plate having elastic force, and the metal plate 822 is formed with a protrusion and depression shape in the PCM tank 820 formed with a hemispheric shape.

When magnetic force is generated by the electromagnet 824, the metal plate moves in a direction in which the electromagnet 824 is positioned, and is deformed by colliding with the PCM tank. Impact is applied to the phase change material in the PCM tank 820 by the deformation of the metal plate 822.

Since the supersaturated solution such as sodium acetate is very unstable, the supersaturated solution easily reacts through a small impact. Therefore, when the shape of the metal plate is deformed by the electromagnet and impact is applied to the sodium acetate, an exothermic reaction is generated as the sodium acetate of the liquid state is converted to a solid state. However, when the sodium acetate absorbs heat, the sodium acetate is dissolved and converted back to the liquid state.

By using the above method, the coolant is efficiently cooled, and the temperature of the coolant may be constantly maintained as necessary.

In particular, when the engine 70 needs to be cooled, heat of the coolant stored in the coolant inflow tank 810 and the coolant exhaust tank 830 is transmitted to the phase change material stored in the PCM tank 820. At this time, the phase change material absorbing heat from the coolant is converted to the liquid state (refer to FIG. 4A).

As such, heat-exchange occurs between the heated coolant by cooling the engine and the phase change material before and after the coolant passes through the radiator 80. Therefore, cooling efficiency of the coolant is improved.

On the contrary, when the engine 70 does not need to be cooled, the metal plate 822 in the PCM tank 820 is deformed by the electromagnet 824. When impact is applied to the phase change material in the PCM tank 820 as the metal plate is deformed, an exothermic reaction is generated as the phase change material in the liquid state is converted to the solid state (refer to FIG. 4B).

Heat generated from the phase change material is transmitted to the coolant stored in the coolant inflow tank 810 and the coolant exhaust tank 830. Therefore, the temperature of the coolant can be maintained over a predetermined temperature.

Here, a status when the engine 70 does not need to be cooled may be a status of warm-up of the engine 70 for a predetermined time after the engine 70 starts, a state that the temperature of the engine 70 does not need to be maintained while the engine 70 is turned off, or the vehicle travels at a high speed with a low load.

Since refrigerant storing tanks (the coolant inflow tank and the coolant exhaust tank) are provided at respective sides of the radiator 80, an additional refrigerant storing tank does not need to be provided in a coolant line. Therefore, a degree of freedom for designing the vehicle engine compartment is increased.

A circulating process of the coolant will now be briefly described. The coolant having a high temperature by circulating in the engine 70 is temporarily stored in the coolant inflow tank 810. The coolant stored in the coolant inflow tank 810 is heat-exchanged with the phase change material stored in the PCM tank 820. The coolant temporarily stored in the coolant inflow tank 810 is circulated through the radiator 80 and cooled by heat-exchange with air flowing from the outside. The coolant circulating through the radiator 80 is temporarily stored in the coolant exhaust tank 830. The coolant temporarily stored in the coolant exhaust tank 830 is heat-exchanged with the phase change material stored in the PCM tank 820. The coolant stored in the coolant exhaust tank 830 flows again into the engine 70. The circulation of the coolant is performed by a water pump 72.

Figure 5:
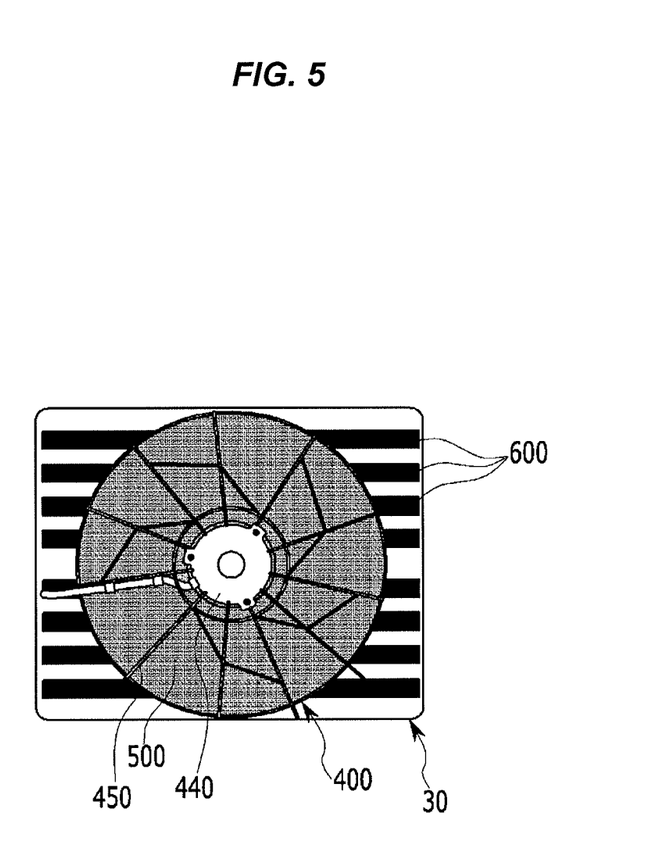
FIG. 5 is a top plan view illustrating a fan shroud according to the present invention.
Figure 6A:
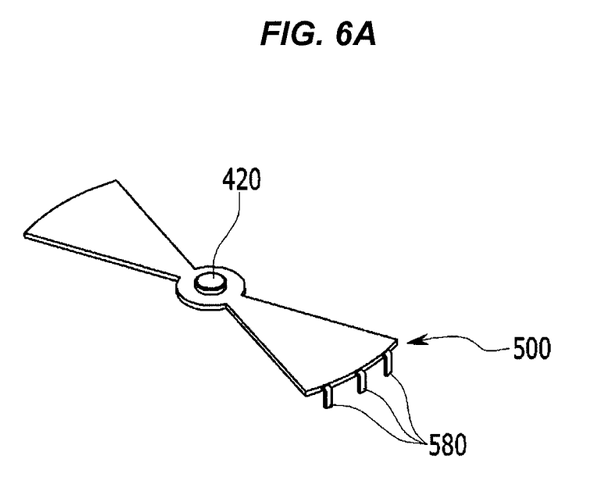
FIG. 6A and FIG. 6B are views illustrating a fan flap of the fan shroud according to the present invention.
Figure 6B:
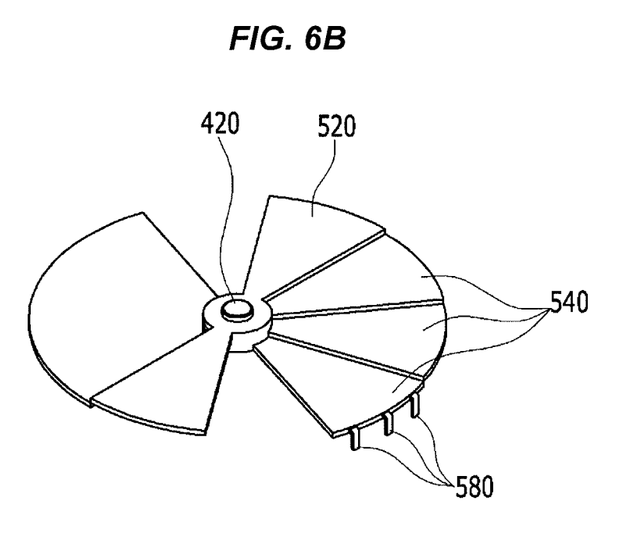

Hereinafter, the fan shroud 30 and the cooling fan 20 will be described in detail. FIG. 5 is a top plan view illustrating a fan shroud according to various embodiments of the present invention. FIG. 6A and FIG. 6B are views illustrating a fan flap of the fan shroud according to various embodiments of the present invention.

Referring to FIG. 5, the fan shroud 30 includes a cooling fan 20 including a fan motor 22 and a fan blade 24. A rotary shutter 400 is provided in the fan shroud 30 while corresponding to an operation area of the fan blade 24, and in which an area through which air passes is varied in a circumferential direction. A plurality of fan flaps 600 are provided in the fan shroud 30, and open and close a part of a portion where the rotary shutter 400 is not mounted. A controller 100 is provided in the fan shroud 30, controls an open area of the rotary shutter 400, operations of opening and closing the plurality of fan flaps 600, and the cooling fan 20 according to an operation status of the vehicle.

The rotary shutter 400 includes a plurality of shutter blades 500 which are provided to be rotatable about a rotation shaft 420, and a shutter actuator 440 which rotates the plurality of shutter blades 500 and changes an area through which air passes.

The shutter actuator 440 may be a servo motor capable of being rotated in forward and reverse directions, and may be mounted in the fan shroud 30 by mounting supporters 450.

The shutter blades 500 include an operation blade 520 which is rotated about the rotation shaft 420 by an operation of the shutter actuator 440, and a plurality of sub-blades 540 which are provided to be superimposed on the basis of the rotation shaft 420 so as to be spread fanwise or folded in accordance with the rotation of the operation blade 520.

When the operation blade 520 is spread or folded, any one of the plurality of sub-blades 540 may be spread or folded, and then the remaining sub-blades 540 may be sequentially spread or folded.

The operation blade 520 and the sub-blades 540 are superimposed on the basis of the rotation shaft 420, and when the operation blade 520 is rotated about the rotation shaft 420 at a predetermined angle by an operation of the shutter actuator 440, the sub-blade 540 which is closest to the operation blade 520 is rotated while a protrusion formed at the sub-blade 540 is caught by the protrusion of the operation blade 520.

In this manner, the respective sub-blades 540 illustrated in the drawings are sequentially spread fanwise.

On the contrary, when the shutter actuator 440 rotates the operation blade 520 in the reverse direction, the sub-blade 540 which is closest to the operation blade 520 is rotated in the reverse direction while the protrusion of the sub-blade 540 is pushed by the opposite protrusion of the operation blade 520.

In this manner, the respective sub-blades 540 illustrated in the drawings are sequentially folded.

Mounting protrusions 580 may be formed on the sub-blade 540 that is positioned at the very end among the sub-blades 540 so that the sub-blade 540 may be fixed to the fan shroud 30.

Electromagnets are provided on the plurality of flaps 600, such that the plurality of flaps 600 may be opened and closed in accordance with an electric current supplied to the electromagnets, and flap rotation shafts are provided on the flaps 600, respectively, so that the flaps 600 may be rotated about the rotation shafts, respectively.

The flap rotation shaft may be a torsion spring, and the flap 600 may be maintained in an opened state when the electric current is not supplied to the electromagnet. In the case of failure of an electric current supply device, the flap 600 is maintained in the opened state so as to prevent the engine 70 from being overheated.

Figure 7:
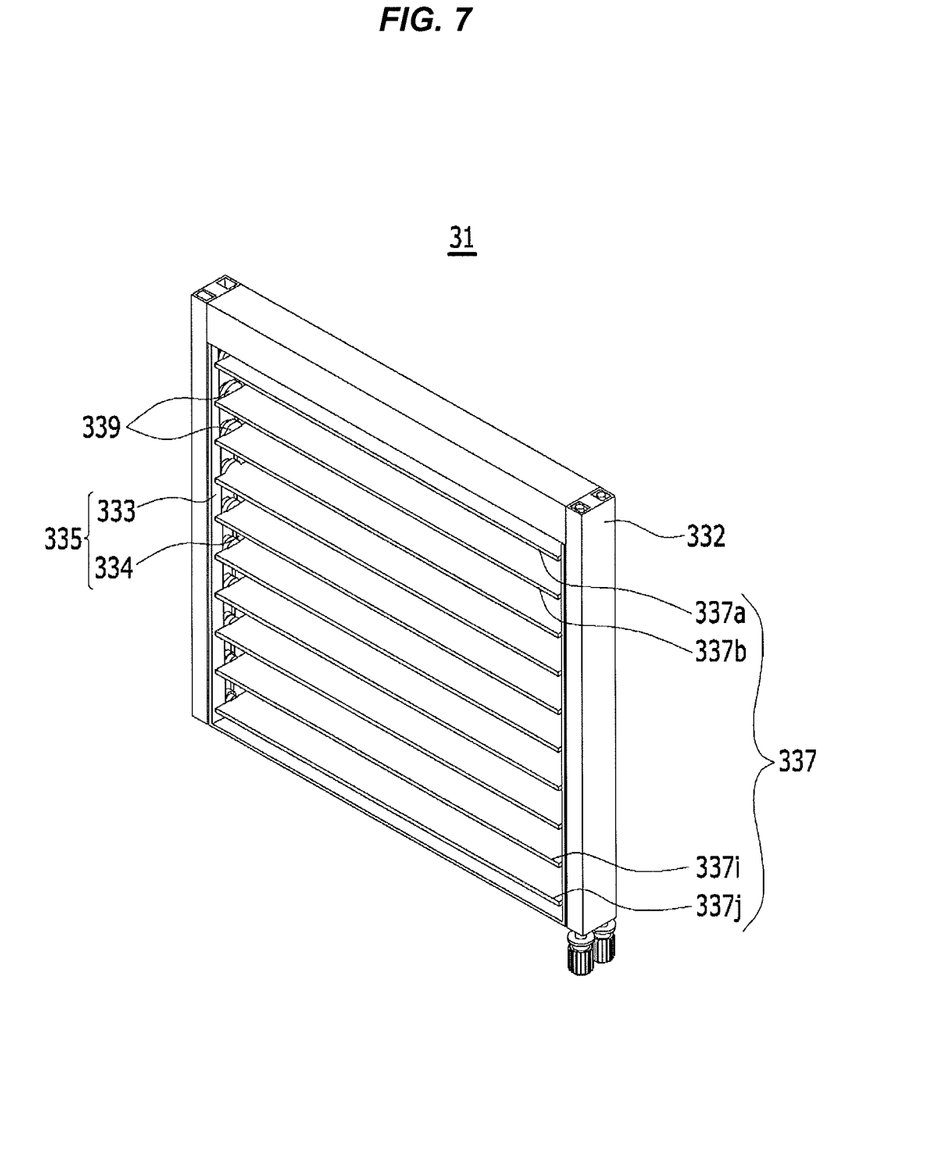
FIG. 7 is a perspective view illustrating an air flow rate control shutter apparatus according to the present invention.
Figure 8:
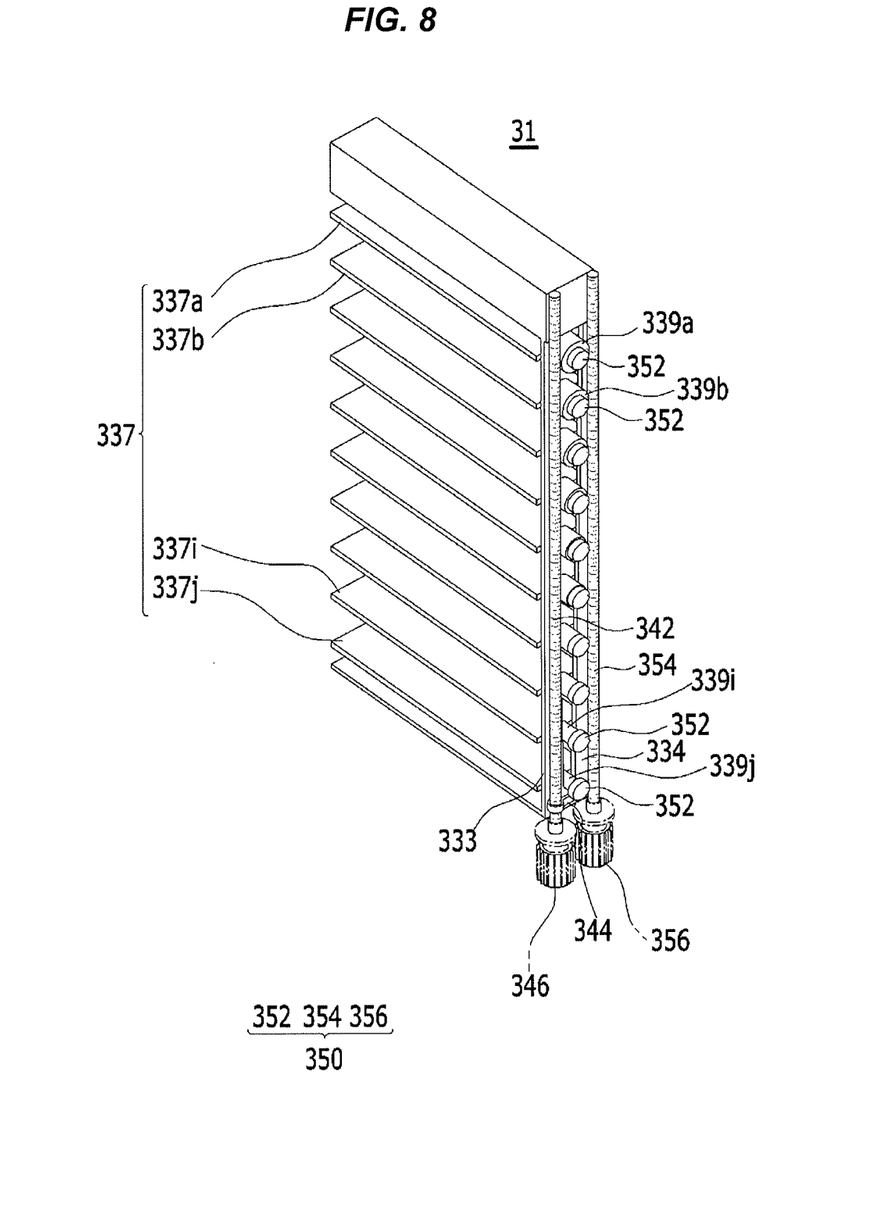
FIG. 8 is a partial perspective view illustrating the air flow rate control shutter apparatus according to the present invention.
Figure 9:
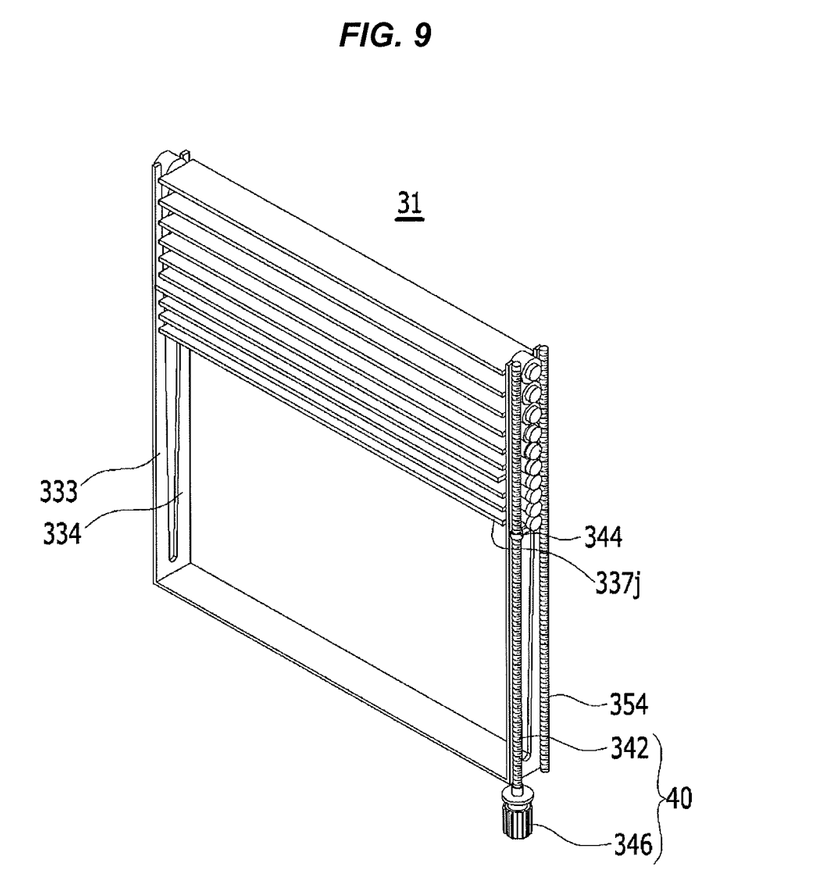
FIG. 9 is a perspective view illustrating the air flow rate control shutter apparatus in which the air flap is folded according to the present invention.

Hereinafter, the air flow rate control apparatus will be described in detail. FIG. 7 is a perspective view illustrating an air flow rate control shutter apparatus according to various embodiments of the present invention. FIG. 8 is a partial perspective view illustrating the air flow rate control shutter apparatus according to various embodiments of the present invention. FIG. 9 is a perspective view illustrating the air flow rate control shutter apparatus in which the air flap is folded according to various embodiments of the present invention.

Referring to FIG. 7 to FIG. 9, the air flow rate control shutter apparatus 31 includes vertical supporting portions provided as pairs, a plurality of air flaps 337 provided to the vertical supporting portion so as to be spread or folded, a delivery unit 340 selectively spreading the air flaps 337, and a rotation unit 350 selectively rotating the air flaps 337.

The vertical supporting portion includes a vertical supporting cover 332, a guide rail 335 provided in the vertical supporting cover 332 and having a width which becomes smaller along a lower direction, and stoppers 339a to 339j provided in the plurality air flaps 337a to 337j, wherein the stoppers have a size corresponding to the width of the guide rail 335 so that the plurality of air flaps are positioned at a predetermined position.

The guide rail 335 includes a front guide rail 333 and a rear guide rail 334, and a distance between the front guide rail 333 and the rear guide rail 334 becomes smaller along a lower direction. A size of the stoppers 339a to 339j provided to the plurality of air flaps 337a to 337j is decreased in proportion to the distance between the front guide rail 333 and the rear guide rail 334.

The delivery unit 340 includes a delivery screw 342 provided to any one of the guide rails 335 (for example, the front guide rail 333), a delivery plate 344 supporting the lowest air flap of the plurality of air flaps 337a to 337j, engaged with the delivery screw 342, and adjusting a position of the lowest air flap when the delivery screw 342 is rotated, and a delivery motor 346 selectively rotating the delivery screw 342.

The rotation unit 350 includes a rotation gear 352 respectively engaged to the plurality of air flaps, a rotation screw 354 provided to the other guide rail (for example, the rear guide rail 334) and selectively engaged with the rotation gears 352, and a rotation motor 356 selectively rotating the rotation screw 354.

Hereinafter, operation of the air flow rate control shutter apparatus 31 will be described in detail.

When the controller 100 operates the delivery motor 346 in state that the plurality of air flaps 337a to 337j are folded according to an operation status of the vehicle, the delivery screw 342 is rotated, and the delivery plate 344 engaged with the delivery screw 342 is moved down.

Then, the stoppers 339a to 339j respectively engaged with the plurality of air flaps 337a to 337j are positioned to a predetermined position such that the size of the stopper 339a to 339j corresponds to the distance between the front guide rail 333 and the rear guide rail 334.

When the controller 100 operates the rotation motor 356 according to the operation status of the vehicle, the rotation screw 354 is rotated, the plurality of air flaps 337a to 337j are rotated by the rotation gear 352, and air flowing through the plurality of air flaps 337a to 337j is controlled.

When the controller 100 folds the plurality of air flaps 337a to 337j according to the operation status of the vehicle, the controller 100 controls operations of the rotation motor 356 and the delivery motor 346 in reverse order.

Hereinafter, operation of the system for controlling the air flow rate control apparatus for the vehicle according to various embodiments of the present invention will be described in detail with reference to FIG. 10A, FIG. 10B, FIG. 10C, FIG. 10D.

As shown in FIG. 10A, FIG. 10B, FIG. 10C, FIG. 10D, operation modes of the system according to various embodiments of the present invention may be divided into the following four modes.

Figure 10A:
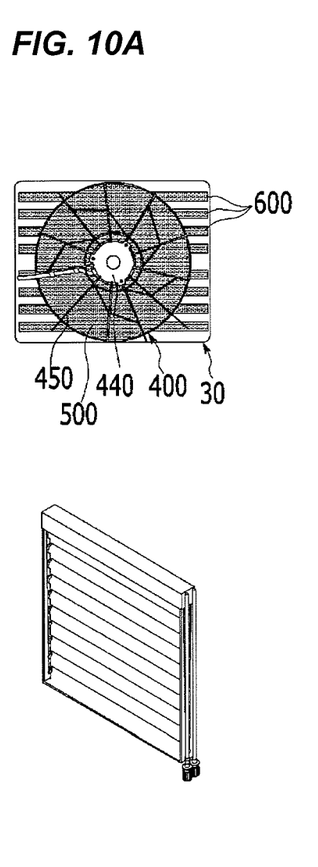
FIG. 10A, FIG. 10B, FIG. 10C, FIG. 10D are views illustrating operation modes of the fan shroud and the air flow rate control shutter apparatus according to the present invention.

A first mode is one in which the plurality of fan flaps 600 are closed, the rotary shutter 400 is completely closed, the plurality of air flaps 337a to 337j are completely closed, and the operation of the cooling fan 20 is turned off.

Figure 10B:
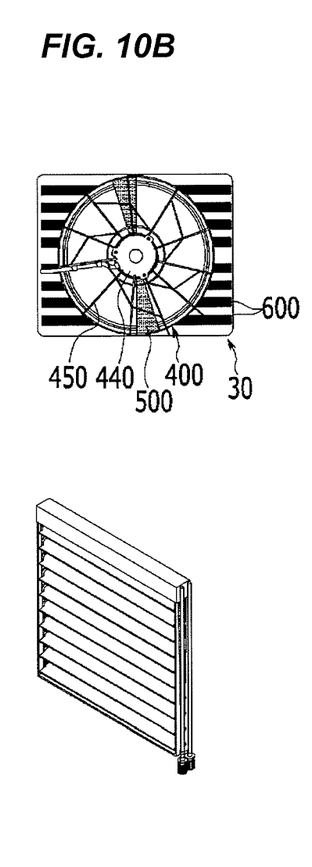

A second mode is one in which the plurality of fan flaps 600 are closed, the rotary shutter 400 is completely opened, a rotation angle of the air flap 337 is controlled in a state that the plurality of air flaps 337a to 337j are expanded, and the operation of the cooling fan 20 is turned off.

Figure 10C:
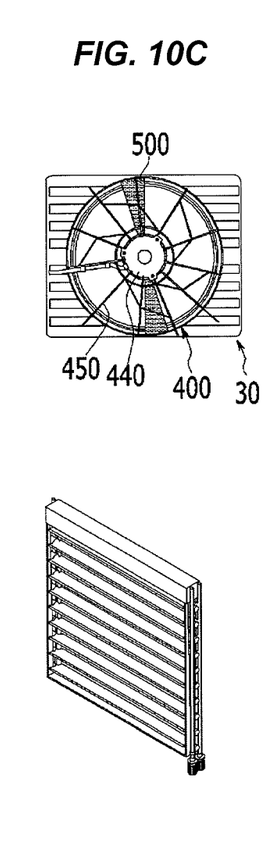

A third mode is one in which the plurality of fan flaps 600 are opened, the rotary shutter 400 is completely opened, the air flaps 337a to 337j are completely opened in a state that the plurality of air flaps 337a to 337j are expanded, and the operation of the cooling fan 20 is turned off.

Figure 10D:
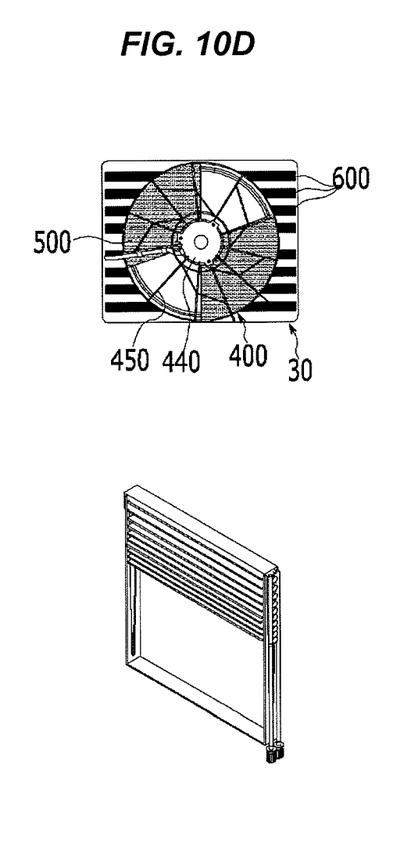

A fourth mode is one in which the plurality of fan flaps 600 are closed, the open area of the rotary shutter 400 is controlled, the plurality of air flaps 337a to 337j are folded, and the operation of the cooling fan 20 is controlled.

The first mode is a state in which aerodynamic performance required for cooling of the engine is not required, for example, may be a state in which it is necessary to warm up the engine 70 for a predetermined time after the engine of the vehicle starts, a state in which it is necessary to maintain a temperature of the engine 70 when turning off the engine, or a state in which the vehicle travels in a high-speed and low-load condition. The corresponding condition may be stored in a predetermined map in advance, and the control unit 100 may compare the map with the operating state of the vehicle so as to determine the first mode.

The second mode is a state in which aerodynamic performance and cooling of the engine can be simultaneously optimized, the open area of the air flap 337 is controlled without operation of the cooling fan 20, and the engine speed is low. The corresponding condition may be stored in a predetermined map in advance, and the control unit 100 may compare the map with the operating state of the vehicle so as to determine the second mode.

The third mode may be a state which corresponds to a high-speed and high-load condition, and the engine 70 can be cooled without operation of the cooling fan 20 at a high speed. The corresponding condition may be stored in a predetermined map in advance, and the control unit 100 may compare the map with the operating state of the vehicle so as to determine the third mode.

The fourth mode may be a state in which cooling performance is maintained at a low-speed and high-load condition, and operation of the cooling fan 20 can be determined by a coolant temperature, a vehicle speed, etc. The corresponding condition may be stored in a predetermined map in advance, and the control unit 100 may compare the map with the operating state of the vehicle so as to determine the fourth mode.

The low-speed or the high-speed condition, for example, may be that of a vehicle speed of about 30-40 kph or about 90-110 kph, but is not limited thereto. The high-load condition, for example, may be that of the engine RPM of about 2000-4000, but is not limited thereto.

As described above, according to the system for controlling a flow rate of air into a vehicle engine compartment according to various embodiments of the present invention, cooling performance may be improved by controlling use of the cooling fan 20, the fan shroud 30, and the air flow rate control shutter apparatus 31 based on the driving state of the vehicle, and aerodynamic performance may be improved by adjusting an amount of air flowing into the vehicle engine compartment.

Further, the coolant having a relatively high temperature temporally stored in the coolant inflow tank 810 and the coolant exhaust tank is heat-exchanged with the phase change material having a relatively low temperature stored in PCM tank 820 during circulation of the coolant cooling the engine. Therefore, cooling performance of the engine 70 is improved.

Further, when cooling of the engine is not required, the phase change material having a relatively high temperature stored in the PCM tank 820 is heat-exchanged with the coolant having a relatively low temperature stored in the coolant inflow tank 810 and the coolant exhaust tank 830. Therefore, when a temperature of the engine compartment needs to be maintained at a predetermined temperature, it becomes easy to maintain the temperature of the engine compartment.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system for controlling a flow rate of air into a vehicle engine compartment, comprising:
   a radiator cooling coolant;
   a coolant inflow tank provided to one side of the radiator and temporarily storing coolant that cools an engine;
   a coolant exhaust tank provided to the other side of the radiator and temporarily storing coolant circulating past a cooling fin of the radiator from the coolant inflow tank;
   Phase Change Material (PCM) tanks provided to an exterior side of the coolant inflow tank and coolant exhaust tank and storing a phase change material heat-exchanging with the coolant stored in the coolant inflow tank and the coolant exhaust tank; and
   a conversion device converting a phase of the phase change material.

2. The system of claim 1, wherein the phase change material is sodium acetate.

3. The system of claim 1, wherein the conversion device comprises:
   a metal plate provided in the phase change material; and
   an electromagnet changing a shape of the metal plate.

4. The system of claim 1, further comprising:
   a fan shroud in which a cooling fan including a fan motor and a fan blade is mounted, the fan shroud being disposed between the radiator and the engine;
   a rotary shutter which is provided in the fan shroud while corresponding to an operation area of the fan blade, and in which an area through which air passes is varied in a circumferential direction; and
   a plurality of flaps which are provided in the fan shroud, and that open and close a part of a portion where the rotary shutter is not mounted.

5. The system of claim 4, wherein the rotary shutter includes:
   a plurality of shutter blades which are provided to be rotatable about a same rotation shaft; and
   a shutter actuator which rotates the plurality of shutter blades, and changes an area through which air passes.

6. The system of claim 5, wherein the shutter blades include:
   an operation blade which is rotated about the rotation shaft by an operation of the shutter actuator; and
   a plurality of sub-blades which are provided to be superimposed on a basis of the rotation shaft so as to be spread or folded fanwise in accordance with rotation of the operation blade.

7. The system of claim 6, wherein operation protrusions are provided to the shutter blades, respectively, and
   when the operation blade is spread or folded, any one of the plurality of sub-blades is spread or folded, and the remaining sub-blades are sequentially spread or folded.

8. The system of claim 4,
   wherein electromagnets are provided on the plurality of flaps so that the plurality of flaps are opened and closed in accordance with an electric current supplied to the electromagnets.

9. The system of claim 4, further comprising
   a controller controlling an open area of the rotary shutter, operations of opening and closing the plurality of fan flaps, the cooling fan, the delivery unit, and the rotation unit according to an operation status of a vehicle,
   wherein the operation modes of the system include:
   a first mode in which the plurality of flaps are closed, the rotary shutter is completely closed, the plurality of air flaps are completely closed, and the operation of the cooling fan is turned off;
   a second mode in which the plurality of fan flaps are closed, the rotary shutter is completely opened, a rotation angle of the air flaps is controlled in a state that the plurality of air flaps are expanded, and the operation of the cooling fan is turned off;
   a third mode in which the plurality of fan flaps are opened, the rotary shutter is completely opened, the air flaps are completely opened in a state that the plurality of air flaps are expanded, and the operation of the cooling fan is turned off; and
   a fourth mode in which the plurality of fan flaps are closed, the open area of the rotary shutter is controlled, the plurality of air flaps are folded, and the operation of the cooling fan is controlled.

10. The system of claim 9, further comprising:
    an atmospheric temperature sensor which measures atmospheric temperature, and outputs a corresponding signal;
    a speed sensor which measures a vehicle speed, and outputs a corresponding signal;
    an air conditioning pressure sensor which measures air conditioning internal pressure, and outputs a corresponding signal;
    an air conditioning switch sensor which measures an operational signal of an air conditioning switch, and outputs a corresponding signal;
    a refrigerant temperature sensor which measures a refrigerant temperature, and outputs a corresponding signal; and
    a position sensor which measures the open area of the rotary shutter, and outputs a corresponding signal,
    wherein the control unit determines the operating state of the vehicle based on the corresponding signals from the respective sensors, and controls operations of the rotary shutter, the plurality of flaps, and the cooling fan in accordance with the operating state of the vehicle in any one mode of the first to fourth modes.

11. The system of claim 1, further comprising:
    an air flow rate control shutter apparatus disposed between the radiator and a condenser disposed at the front of the radiator, wherein the air flow rate control shutter apparatus includes:
vertical supporting portions provided as a pair;
a plurality of air flaps provided to the vertical supporting portions so as to be spread or folded;
a delivery unit selectively spreading the air flaps;
a rotation unit selectively rotating the air flaps; and
a controller controlling the delivery unit and the rotation unit according to an operation status of a vehicle.

12. The system of claim 11,
wherein the vertical supporting portion includes:
a guide rail having a width which becomes smaller along a lower direction,
wherein stoppers are provided in the plurality of air flaps, and the stoppers have a size corresponding to the width of the guide rail so that the plurality of air flaps are positioned at a predetermined position.

13. The system of claim 11,
wherein the delivery unit includes:
a delivery screw provided to any one of the guide rails;
a delivery plate supporting the lowest air flap of the plurality of air flaps, engaged with the delivery screw, and adjusting a position of the lowest air flap when the delivery screw is rotated; and
a delivery motor selectively rotating the delivery screw.

14. The system of claim 11,
wherein the rotation unit includes:
rotation gears respectively engaged to the plurality of air flaps;
a rotation screw provided to another guide rail and selectively engaged with the rotation gears; and
a rotation motor selectively rotating the rotation screw.

15. The system of claim 11,
wherein the delivery unit includes:
a delivery screw provided to any one of the guide rails; and
a delivery plate supporting the lowest air flap of the plurality of air flaps, engaged with the delivery screw, and adjusting a position of the lowest air flap when the delivery screw is rotated,
wherein the rotation unit includes:
rotation gears respectively engaged to the plurality of air flaps; and
a rotation screw provided to another guide rail and selectively engaged with the rotation gears, and
wherein the air flow rate control shutter apparatus further includes a driving motor selectively rotating the delivery screw or the rotation screw.

16. The system of claim 1, further comprising an encapsulator which surrounds the engine compartment.

* * * * *

UNITED STATES PATENT AND TRADEMARK OFFICE
CERTIFICATE OF CORRECTION

PATENT NO. : 9,523,305 B2  
APPLICATION NO. : 14/550198  
DATED : December 20, 2016  
INVENTOR(S) : Jongwoo Nam et al.

Page 1 of 1

It is certified that error appears in the above-identified patent and that said Letters Patent is hereby corrected as shown below:

On the Title Page

Item (73) Assignees:  
Delete:  
"Hyudai Motor Company, Seoul (KR)"  
And insert therefor:  
--Hyundai Motor Company, Seoul (KR)--.

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*